Jan. 31, 1961  M. ZASLAWSKY  2,970,017
SHOCK ABSORBING BEARING FOR MEASURING INSTRUMENT
Filed April 7, 1958

INVENTOR
MOISE ZASLAWSKY
By Irwin S. Thompson
ATTY.

United States Patent Office 2,970,017
Patented Jan. 31, 1961

2,970,017

SHOCK ABSORBING BEARING FOR MEASURING INSTRUMENT

Moise Zaslawsky, Neuchatel, Switzerland, assignor to Isico S.A., Geneva, Switzerland, a company of Switzerland Filed Apr. 7, 1958, Ser. No. 726,712

Claims priority, application Switzerland May 7, 1957

5 Claims. (Cl. 308—159)

The present invention has for its object a shock absorbing bearing, in particular for measuring apparatus, which comprises a support provided with a recess within which is lodged a thrust socket intended for receiving the end of a shaft and submitted to the action of an elastic return device, characterized by the fact that said thrust socket is mounted in such a way as to be able, on the one hand, to slide axially in said recess and, on the other hand, to rock about itself against the action of the elastic device, so as to absorb the axial and radial shocks to which said shaft is subjected, and by the fact that the elastic device is constituted by a spring lodged in said recess, and which bears on said thrust socket by the intermediary of a thrust surface having the form of a portion of sphere.

The attached drawing shows schematically and by way of example, two forms of construction of the bearing forming the object of the invention.

Figure 1:
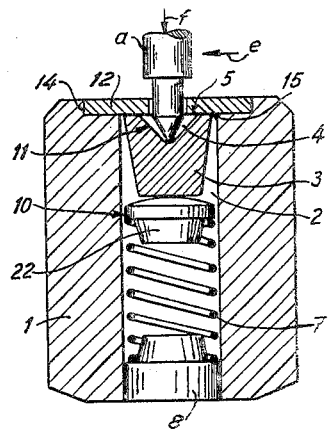
Fig. 1 shows a cross section of the first form of construction.

According to Fig. 1 of the drawing, the bearing comprises a tubular support 1 intended to be fixed to the frame of a measuring apparatus, for instance. A thrust socket 3, lodged inside an internal cylindrical recess or bore 2 of the support 1, is constituted by a stone having the shape of a truncated cone in which is provided a conical recess 4, opening towards its large base 5 and intended to receive the conical end of the shaft a. The diameter of this large base 5 corresponds to the bore of the recess 2, so that the thrust bearing can slide axially in this recess without appreciable radial clearance. Furthermore due to the conicity of the lateral surface 6 of this thrust socket, this latter is able to rock about itself inside the recess 2.

A spring 7, set in the recess 2,, bears on the support 1 by the intermediary of a plug 8 and acts, by the intermediary of an intermediate part 22, constituted by a buffer, on the thrust socket 3, in order to keep said thrust socket in its rest position (shown in the drawing) for which its front face 5 bears on an abutment 12 constituted by a washer set in a recess 14, provided in the support 1.

The face 13 of the intermediate part which is in contact with the small base 9 of the thrust socket has the form of a portion of sphere. The cylindrical external surface 10 of the intermediate part constitutes a guiding surface co-operating with the cylindrical internal surface of the recess 2. The conical extremity of the shaft is engaged into the conical recess 4 of the thrust socket and rests on the bottom 11 of the recess.

Figure 2:
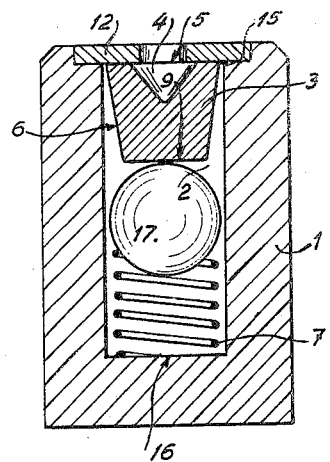
Fig. 2 shows a cross section of the second form of construction.

The working of the described bearing is the following:

When the shaft a undergoes an axial shock as per the arrow f, this shaft is displaced axially against the action of the spring 7 and the thrust socket as well as the buffer 22 slide inside the recess 2. This axial shock is thus absorbed by the spring 7. On the contrary, when the shaft undergoes a radial shock, as per the arrow e, it causes a rocking of the thrust socket 3 about a point located on the peripheral edge 15, which is resting on the abutment 12. This rocking is made possible due to the conicity of the lateral sides 6 of the thrust socket. Due to the fact that the thrust face 13 of the intermediate part 22 has the shape of a portion of sphere, the small base 9 of the thrust socket can easily slide on this portion of sphere by axially pushing back this intermediate part 22 against the action of the spring 7. Consequently, when the shaft undergoes a radial shock, the thrust socket 3 is able to rock about one or other point of its peripheral edge 15, which allows the absorption of this radial shock to avoid any deformation of the shaft. In the form of construction shown in the Fig. 2, the recess 2 is constituted by a cylindrical recessed hole, provided in the support 1. The spring 7 bears on the bottom 16 of this recess and acts on the conical thrust socket 3 by the intermediary of an intermediate part constituted by a sphere 17, the diameter of which corresponds to the diameter of the recess 2.

The working of the bearing according to this second form of construction is similar to that described with reference to Fig. 1. However any risk of jamming of the intermediate part at the time of an axial displacement of said part inside the recess 2, caused by the rocking of the thrust socket 3, is avoided, as this intermediate part is constituted by a ball.

From the foregoing and from the examination of the attached drawing, one can easily realize the very great simplicity of design of the bearing, forming the object of the invention, and that said bearing always insures the return of the thrust socket into its centered rest position shown in the drawings, so that after having undergone a shock, the shaft a is always automatically returned into its axial and radial correct position.

Figure 3:
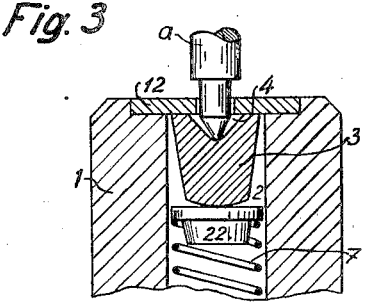
Fig. 3 is a view similar to that of the preceding figures of a further form of construction.

Multiple variants of construction can be provided allowing the action of the spring 7 on the thrust socket by the intermediary of a thrust surface having the form of a portion of sphere. Thus, for example, in Fig. 3, the spring 7 is acting on the thrust socket 2 by the intermediary of a buffer 22. The front face of this buffer 22, in contact with the thrust socket 2, is flat while the rear front face of the thrust socket 2 is convex in the form of a portion of a sphere.

The recess 4 of the thrust socket intended to receive the end of the shaft could be of ogival, spherical or any other from adapted to the imposed requirements and presently utilized yet in bearings of known types.

I claim:

1. A shock absorbing bearing especially for measuring apparatus comprising a support having a bore therein, a frusto-conical thrust socket having a large base and a small base housed inside said bore, with the large base positioned to face outwardly of the bore, and provided with a recess in the large base thereof to receive the end of a shaft, an abutment provided at the outer end of the bore in said support for engaging the large base of the socket, a resilient return device comprising a spring housed inside said bore and acting on the small base of said thrust socket urging the socket outwardly of the bore against said abutment, said thrust socket being mounted in said bore in such a way as to be able on the one hand to slide axially in said bore and on the other hand to rock against the action of said resilient return device in order to absorb axial and radial shocks to which said shaft is subjected, and a thrust piece interposed between said spring and said small base of said conical thrust socket, one of the surfaces of said thrust socket and of said thrust piece which are in contact having the form of a portion of a sphere with a radius at least equal to the radius of said bore.

2. A shock absorbing bearing according to claim 1, in which said thrust piece comprises a buffer having guiding surfaces cooperating with the internal surfaces of said bore.

3. A shock absorbing bearing according to claim 2 and in which the front face of said buffer which is in contact with said thrust socket is shaped in the form of a portion of a sphere.

4. A shock absorbing bearing according to claim 2 and in which the rear face of said thrust socket in contact with said buffer is shaped in the form of a portion of a sphere.

5. A shock absorbing bearing according to claim 1 in which said thrust piece comprises a ball having a diameter corresponding at least to the diameter of said bore.

References Cited in the file of this patent

UNITED STATES PATENTS 2,372,972     Morf                Apr. 3, 1945

FOREIGN PATENTS 886,085     Germany            Aug. 10, 1953